United States Patent [19]

Meckler

[11] Patent Number: 5,279,609
[45] Date of Patent: Jan. 18, 1994

[54] AIR QUALITY-TEMPERATURE CONTROLLED CENTRAL CONDITIONER AND MULTI-ZONE CONDITIONING

[76] Inventor: Milton Meckler, 930 20th St., Santa Monica, Calif. 90403

[21] Appl. No.: 969,053

[22] Filed: Oct. 30, 1992

[51] Int. Cl.$^5$ .................................. F25D 17/08
[52] U.S. Cl. ........................ 236/49.3; 62/78; 62/186; 454/229; 454/256; 165/16
[58] Field of Search ............ 236/49.3, 49.1, 49.2; 62/78, 186; 454/229, 256, 257, 258; 165/16, 54

[56] References Cited

U.S. PATENT DOCUMENTS

| | | | |
|---|---|---|---|
| 4,487,363 | 12/1984 | Parker et al. | 236/49.3 |
| 4,730,461 | 3/1988 | Meckler | 62/159 |
| 4,739,624 | 4/1988 | Meckler | 62/160 |
| 4,887,438 | 12/1989 | Mecker | 62/271 |
| 5,119,987 | 6/1992 | Kobayashi | 236/49.3 |
| 5,161,608 | 11/1992 | Osheroff | 236/49.3 X |

*Primary Examiner*—Harry B. Tanner
*Attorney, Agent, or Firm*—William H. Maxwell

[57] ABSTRACT

An air quality and temperature responsive air conditioning system wherein modules are employed to precondition the air for humidity control, to heat and cool the air, and to bypass the supply air in excess of the demand of a multiplicity of comfort zones with thermostat control, and featuring a bypass module characterized by parallel ducting, one ducting which is restricted by a damper responsive to a supply air back pressure sensor, and one ducting which is opened by a damper responsive to an air quality sensor.

28 Claims, 5 Drawing Sheets

AIR QUALITY-TEMPERATURE CONTROLLED CENTRAL CONDITIONER AND MULTI-ZONE CONDITIONING

BACKGROUND OF THE INVENTION

This invention relates to central air conditioning with multi zone controllers for serving separate comfort air spaces, it being a general object of this invention to independently control air temperature and air quality. Air is conditioned herein by the controlled application of chilled and/or hot water, however it is to be understood that mechanical refrigeration and gas fired or electric furnaces can be employed. Air quality is conditioned herein by the controlled filtration of return air (RA), an advantageous feature of this system being bypass of excess supply air through run-around ducting, in response to closure of one or more zone dampers, and characterized by a bypass damper means that prevents excess supply air pressure, it being an object of this invention to provide a bypass filtration module that replaced the prior art bypass and in the form of a unit that is installed in the run-around ducting. A feature of this bypass filtration module is its coordinated functions in response to zone controller closures as well as air quality deterioration in any one or more of the separate comfort air spaces serviced by this system.

It is an object of this invention to combine variable air volume (VAV) and a bypass filtration system (BPFS), operable with a multiplicity of zone controllers and each of which services a separate conditioned zone. The zone controller draws air from a continuously operating central air conditioning unit, a cooling and heating unit that receives outside air (OSA) and return air (RA) and which delivers supply air (SA) at substantially constant volume and at a controlled temperature, and at a controlled pressure by means of a recirculation duct in which the bypass-filtration module is installed for air quality and temperature control. The zone controllers discharge conditioned supply air on demand in response to thermostat controls in each separate zone, the central air conditioning unit being activated when there is a demand, and any surplus conditioned air is recirculated through the bypass-filtration module herein disclosed. In accordance with this invention, the bypass-filtration module is comprised of parallel ducting and each controlled by a positionable air flow restrictor means, one of which responds to return air pressure, and one of which responds to an air quality sensor (AQS). In practice, there is a pressure sensor at the delivery of the central air conditioning unit, and there is at least one air quality sensor in a conditioned or related zone and preferably in the return air (RA) duct as shown herein. Accordingly, it is an object of this invention to coordinate both the supply of tempered air (heated or cooled) and the quality thereof.

Distribution of air tempered by the central air conditioning unit is by zone damper means in each of the zone controllers, the volume of supply air discharged being governed by a thermostat in the separate zone served by said controllers. As the conditioned air demand decreases, supply air flow is restricted so as to cause pressure to increase in the supply air duct and which is sensed and a signal transmitted to a bypass air flow restrictor means of the bypass-filtration module, for recirculating a commensurate air volume while meeting air flow demand from the supply air duct. The air flow restrictor means is a variably positionable motorized damper.

Quality of air is determined to exist by any one of a number of contaminant-gas sensors. That is, particulate matter and/or gasses such as carbon dioxide are detected and their proportionate density determined. And, when a certain threshold of density of a contaminant is determined, the air quality sensor (AQS) responds and a signal is transmitted to the filtration air flow restrictor means of the bypass-filtration module, for processing a recirculated air volume commensurate with the demand signal. It is an object therefore, to provide filter means in the bypass-filtration module, a means for removing particulate matter and/or means for removing certain contaminant gasses. In practice, filter packs of varied mesh are employed, and carbon filter packs or the like to remove certain gasses.

SUMMARY OF THE INVENTION

The bypass-filtration module as herein disclosed is comprised of a double bypass combination incorporated in the run-around duct of a variable air volume (VAV) system that supplies a multiplicity of zone air controllers serviced by a central air conditioning unit. The central air conditioning unit is operated on demand and is of a capacity to supply the multiplicity of zones. And, upon partial or complete closure of any one or all of the zone controllers, there is a commensurate reduction in supply air demand, the surplus supply air being routed through the run-around ducting controlled by the variably positionable motorized dampers of the bypass filtration module, there being a pressure control damper and an air quality control damper. In practice, the air quality control damper preempts positioning of the pressure control damper, whereas the pressure control damper automatically supplements any flow demand inadequacy of flow through the filters as controlled by the quality control damper. A feature of the by-pass filtration module is the cooperative effect of the parallel ducting and separately operable dampers controlling the same.

The foregoing and various other objects and features of this invention will be apparent and fully understood from the following detailed description of the typical preferred forms and applications thereof, throughout which reference is made to the accompanying drawings.

PREFERRED EMBODIMENT

Referring now to the drawings, this invention resides in variable air volume (VAV) bypass filtration systems (BPFS) used in combination with a heating, ventilating and air conditioning (HVAC) system. A feature of this invention is independent response to both supply air (SA) pressure and to indoor air quality (IAQ), whereby variable air volume is simultaneously performed with air dehumidification and pollution reduction. In accordance with this invention, the bypass filtration module M is provided in a parallel run-around duct that recirculates supply air in response to its back pressure and filtered thereby in response to zone air quality. Outside air (OSA) is preconditioned, and an IAQ sensor S2 is located in the conditioned zone, or in the return air duct from said zone or zones.

Figure 1:
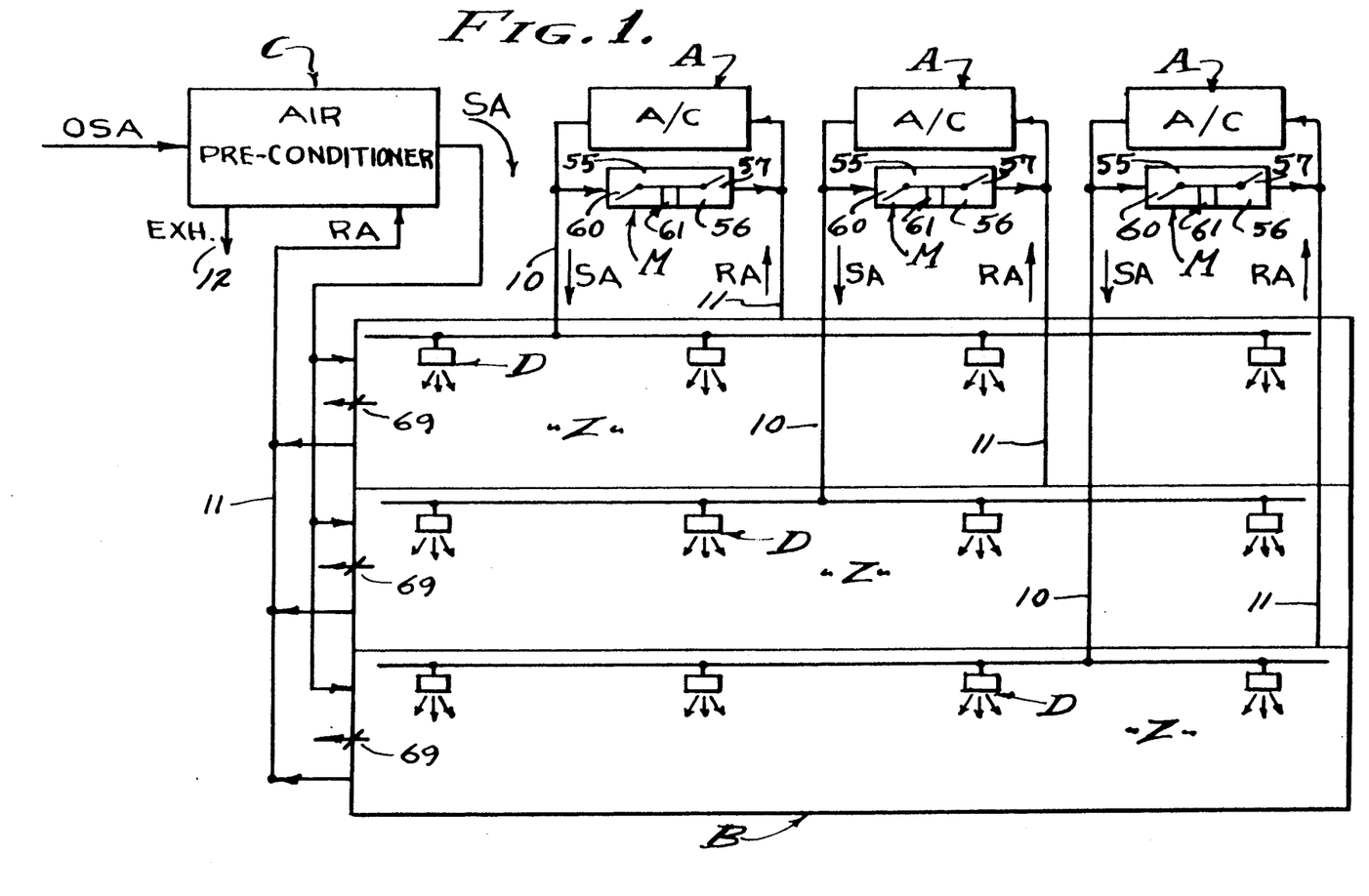
FIG. 1 is a schematic view of a typical Heating, Ventilating and Air Conditioning (HVAC) system, wherein a desiccant air-preconditioner serves at least one and preferably a plurality of comfort zones, and a central air conditioner unit for heating or cooling supply air (SA) on demand and delivered through a multiplicity of damper modules and into separate air conditioned comfort zones, and each air conditioner unit being combined with a bypass-filtration module separately responsive on demand to supply air pressure and to supply air quality.

As shown in FIG. 1 of the drawings, there is a multiplicity of independently operable air conditioning HVAC units A installed in a building complex B, three as shown and each serving one or more separate air spaces or zones. Each air conditioning unit has heating and/or cooling capability, as by means of heating and-/or cooling coils as shown, or as by integral mechanical refrigeration and furnace heating, or as by heat pump means, or the like. Each air conditioning unit A has a supply air (SA) duct 10 delivering conditioned air to a series of damper modules D controlled by thermostat sensors T placed strategically within the serviced zone Z. Return air (RA) is via a return air duct 11 to the air conditioning unit A. In practice, a portion of the return air is discharged as exhaust air (EA) at 12, and is replaced by new outside air (OSA). As shown herein, this exhaust of and replacement by new air is accomplished by means of an air pre-conditioner (APC), such as a dehumidifier unit C, and as is disclosed in my U.S. Pat. No. 4,887,438; the unit C as herein disclosed. Therefore, the return air duct 11 passes through the preconditioner unit C, where a portion of the return air is exhausted and replaced by outside air.

Each air conditioning (HVAC) unit A is a means shown as an air coil (A/C) unit having a heating coil 14 and a cooling coil 15. In practice, the coil 14 passes hot water from a heating source while the coil 15 passes cold water from a chilling source, both sources (not shown) being controlled by controller means 16 that coordinates temperature demand signals from the zone thermostats T. Air intake into the air conditioning unit A is from the return air (RA) duct 11 through a primary filter 17 and air blower 18. Air outlet from the air conditioning unit A is into the supply air (SA) duct 10 and to a series of damper modules D individually controlled by the thermostats T placed in their respective zones Z. As shown in FIG. 1, the return air duct 11 receives a minimum amount of outside air (OSA) through the air preconditioner (APC) as later described, and can also receive a maximum amount of outside air (OSA) through an intake blower 19. Ducting for these purposes is as shown generally in FIG. 1 of the drawings.

Figure 8:
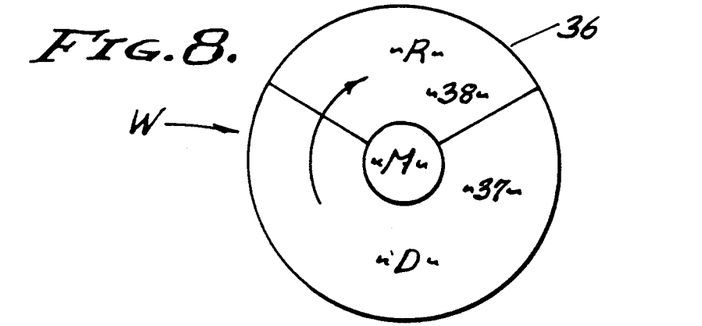
FIG. 8 is an illustration of a desiccant wheel as it is used herein, to show the movement and areas thereof applied to dehumidification and to regeneration (normal application).

The air pre-conditioner (APC) dehumidifies and absorbs pollutants from outside air by means of a desiccant dehumidifier unit C, preferably of the wheel type W as shown. Wheel W can vary in form as may be required, and is shown as a rotating cylinder 36 of the regenerating type having a dehumidifying segment 37 in the intake air ducting means a, and having a regenerating segment 38 in the exhaust air ducting means b. Porportionate use of these two segments is variable and depends upon the volumetric flow ratio of the two opposing air streams and the available temperature of regeneration air immediately prior to entering the regenerating segment 38 (see FIG. 6). The higher the regeneration temperature, the smaller the area needed for segment 38 for regeneration and the larger is the available area of segment 37 for enhanced flow capacity at a given velocity. Where this ratio is 2 to 1, as shown in FIG. 8, approximately two thirds of the desiccant wheel is devoted to segment 37 for dehumidification by absorbing moisture, while one third is devoted to segment 38 for regeneration of the weakened moisture saturated desiccant. Regeneration of weakend desiccant is by means of heated or tempered air delivered through ducting means b, wherein heat is applied by heating means 21 as needed to achieve the desired inlet regenerating air temperature to segment 38. The desiccant wheel is shown in FIG. 8 as a packed-type cylinder comprising a suitable air permeable desiccant material of, for example, alumina, silica gel, lithium chloride or suitable hygroscopic polymers, and the like.

Figures 9, 10:
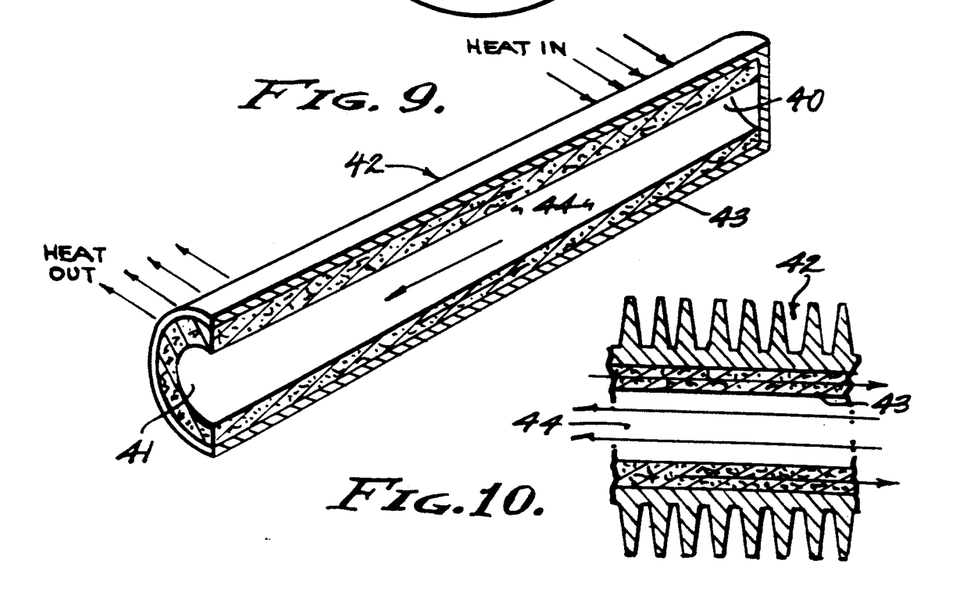
FIG. 9 is a perspective fragmentary section of a heat pipe configuration employed herein as the heat transfer means.
FIG. 10 is an enlarged fragmentary sectional view showing an improved finned heat pipe and its internal heat flow.

The heat transfer means 42 removes the heat resulting from absorbtion of moisture into the desiccant and is positioned immediately downstream from the desiccant wheel section 37. The means 42 is in the form of heat pipes characterized by a hot end 40 for the absorption of heat, and by a cold end 41 for the dissipation of heat. In other words, there is a "heat in" end 40 and a "heat out" end 41. In carrying out this invention, the heat in end 40 is placed in the ducting means a following moisture absorbtion by the desiccant, while the heat out end 41 is place in the ducting means c for dissipation of heat into exhaust air at 12. Accordingly, there is a heat transfer that occurs between ducting means a and ducting means c, by means of a bank comprised of a multipicity of heat pipes, the hot ends in the form of heat absorbers, and the cold ends in the form of heat dissipators. In practice, the heat pipes are short lengths of heat conductive tubing sealed at their opposite ends, having fitting tubular wick lining 43 and charged with a refrigerant 44, a gas-liquid. A temperature differential between the ends of each pipe causes the refrigerant 44 therein to migrate by capillary action to the warmer end where evaporation thereof takes place and absorbs heat. The resultant refrigerant vapor then returns through the hollow tube center of the wick lining 43 and to the cooler end 41 of the pipe where it gives up the heat carried thereby, by condensing into the wick lining 43, and repeating the cycle. The heat transfer process is efficient, as the heat pipes are sealed and have no moving parts, and require little or no maintenance.

The heater means 21 raises the air temperature in ducting means b for effective regeneration of the desiccant in segment 37 of the desiccant wheel W. Means 21 is a gas fired furnace, or the like, that heats the column of air passing through duct b and through the regenerative segment of the wheel W. Means 21 is thermostatically controlled and brings the column of air to regenerating temperature, whether pre-heated or not.

During the summer and similar warm weather, the heating means 42 functions as shown in the drawings to support the dehumidification process performed by this air preconditioner (APC). However, during the winter and similar cold weather, the heat pipe means 42 functions automatically in a reverse process of heat transfer, thereby pre-heating and humidifying incoming air through ducting means a.

Figure 6:
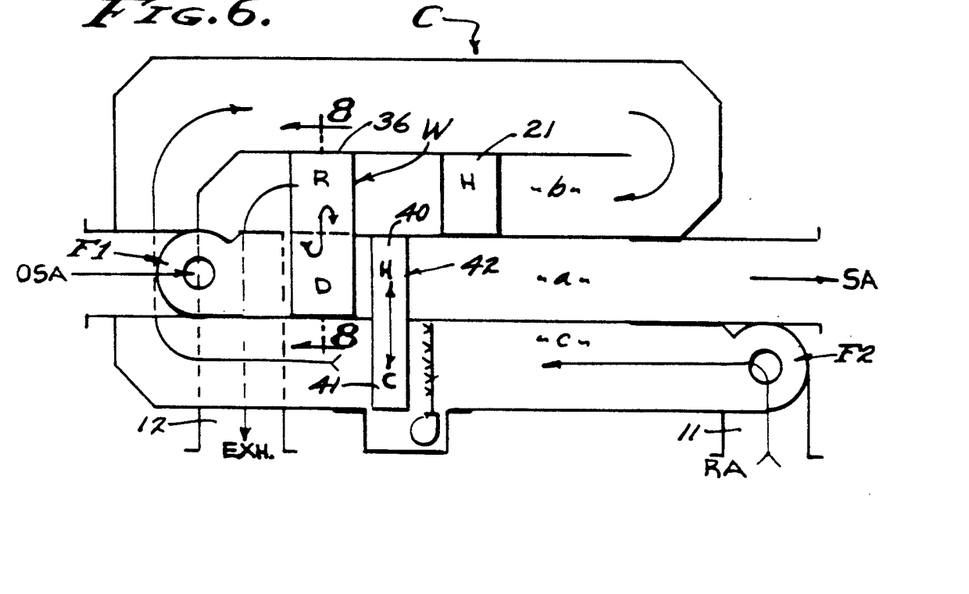
FIG. 6 is a sectional view of the air preconditioner unit as taken by line 6—6 on FIG. 3.
Figure 7:
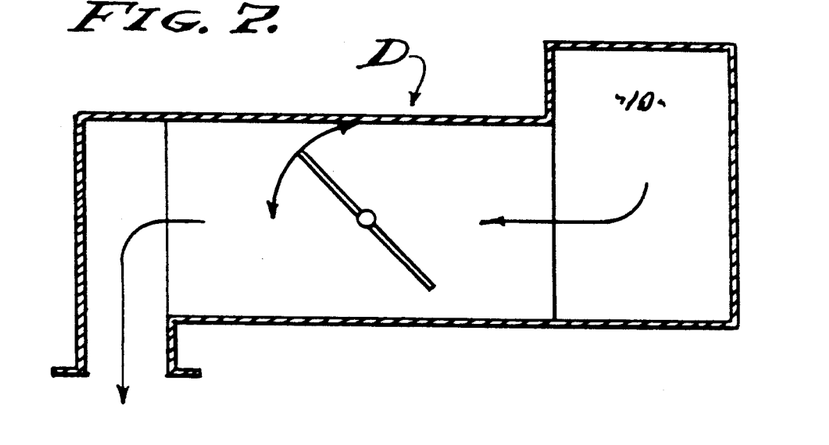
FIG. 7 is a sectional view of the air damper module as taken by line 7—7 on FIG. 3.

A basic implementation of the air pre-conditioner (APC) dehumidifier unit C is shown in FIG. 6 of the drawings, wherein the structural combination of ducting means a, b and c is made functional for stand-alone operation of the unit to dehumidify conditioned space. Accordingly, return air (RA) is delivered to ducting means c by a fan F2 and passed through the heat pipe means 42. The heat pipe means 42 removes the heat of absorbtion from the dehumification process, after which the air column is directed through ducting means b and brought to an effective regenerating temperature by the heater means 21 and passed through the regenerating segment 37 of the desiccant wheel W. The ducting means a is dedicated to pass the incoming (OSA) air through the dehumidifying section 38 of the desiccant wheel W, for discharge as supply air (SA). Air flow through and exhaust from the ducting means c and b is by means of a fan F1, as shown. Accordingly, discharge of duct c is at exhaust 12. The pre-conditioner unit or dehumidifier unit C is a package air conditioner combination utilizing an implementation such as that shown herein, delivering pre-conditioned air to the plurality of air conditioning (HVAC) units A for variable air volume (VAV) distribution by means of a multiplicity of damper modules D serving separate comfort zones Z.

Figure 5:
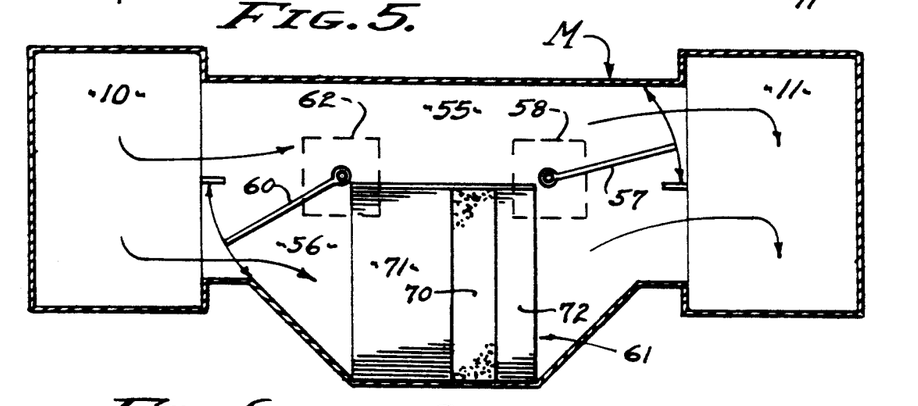
FIG. 5 is a sectional view of the bypass-filtration module as taken by line 5—5 on FIG. 3.

In accordance with this invention, I provide the bypass-filtration module M in combination with each of said plurality of air conditioning units A, each conditioner-bypass combination serving at least one and preferably a multiplicity of damper modules D via a supply air (SA) duct 10 as hereinabove described. As best illustrated in FIG. 5 of the drawings, the bypass-filtration module M is comprised of parallel ducts 55 and 56 which are also in parallel with the supply air duct 10 and through the air conditioning unit A. The inlet to ducts 55-56 is from duct 10 at the discharge of unit A, while the outlet of ducts 55-56 is into the duct 11 at the inlet of unit A. Alternately, the inlet and outlet, or inlets and outlets, of ducts 55 and 56 can be from and into the air conditioning unit A housing. There are desiccants that absorb gasses.

Transport of air through the ducts 55 and 56 is by means of differential air pressure or back pressure in the supply air duct 10, as is caused by infinitely modulated closure of one or more damper modules D through motorized operation thereof responsive to individual zone thermostats T. As shown, there are four zone damper modules serving four separate zones Z, in series from each air conditioning unit supply air duct 10. Accordingly, as shut-down occurs as a result of damper closure, pressure is increased which causes a commensurate increase in run-around flow of supply air through one or both bypass ducts 55 and 56. The supply air is transported by the blower 18 of air conditioner unit A.

A feature of this invention is that there is a primary damper means 57 in the duct 55, said damper being infinitely variably modulated in response to a pressure sensor S1 and control means 58 in the supply air duct 10. This primary duct 55 is open between the air conditioner unit discharge into supply air duct 10 and the inlet from return air duct 11, run-around of air being dependent upon the pressure differential between the discharge and inlet of unit A, whereby run-around air volume increases with back pressure in duct 10, and visa versa, as caused by zone damper opening and/or closing.

In accordance with this invention, there is a secondary damper means 60 and a secondary air filter 61 in the duct 56, said damper being infinitely variably modulated in response to at least one indoor air quality (IAQ) sensor S2 and control means 62 in at least one and preferably each comfort zone Z. The secondary duct 56 is open between the air conditioner unit discharge into supply air duct 10 and the inlet from return air duct 11, run-around of air therethrough being dependent upon the air quality signal from sensor S2 and control means 62. A feature of this invention is that the pressure controlled damper 57 has no effect on the opening and closing of damper 60, whereas operation of damper 60 changes the supply air (SA) pressure so as to preempt and/or control the run-around air volume through duct 55, damper 57 being responsive to supply air pressure.

Figure 3:
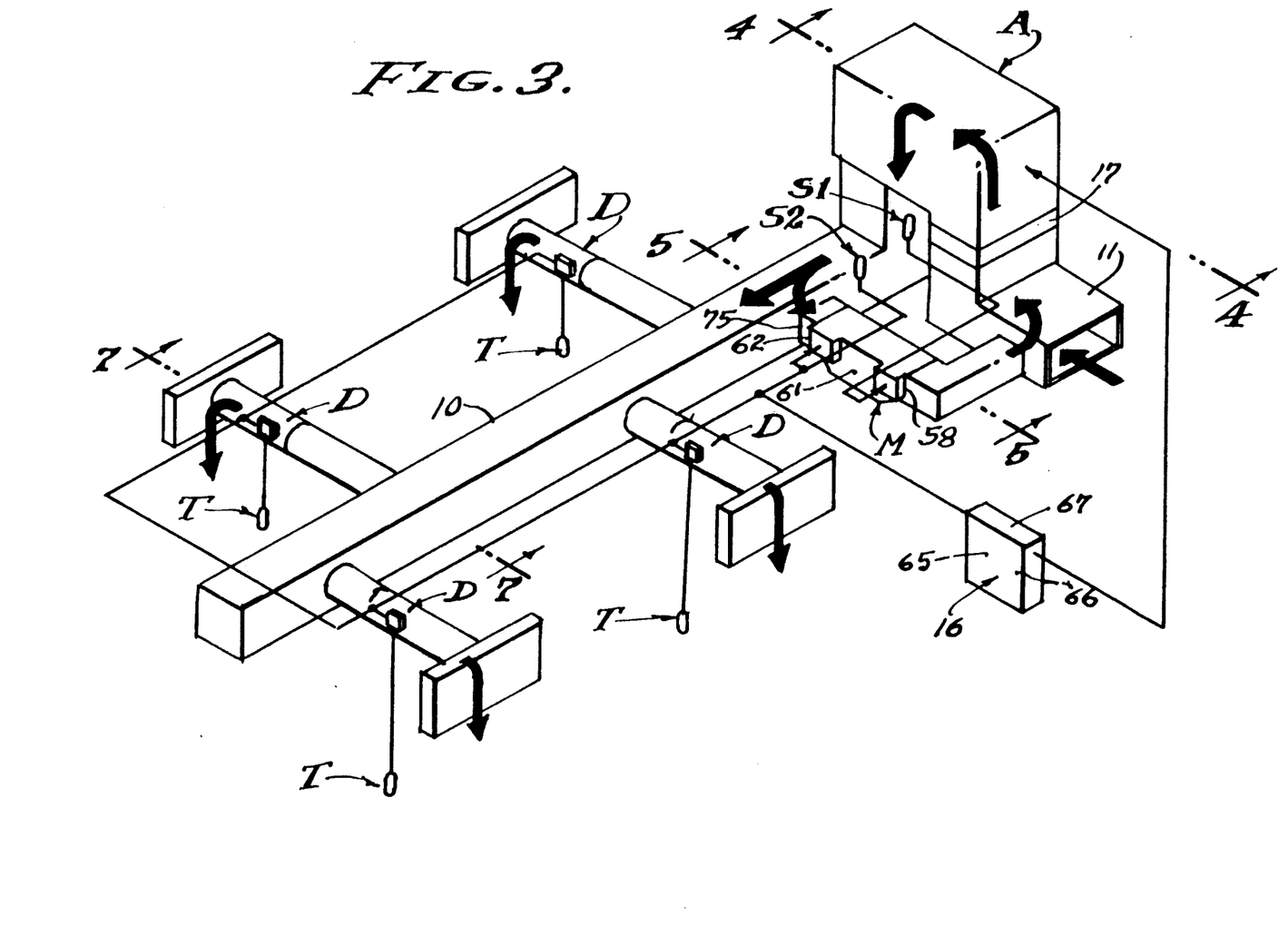
FIG. 3 is a perspective view of the variable air volume system and bypass-filtration module of the present invention combined therewith.
Figure 4:
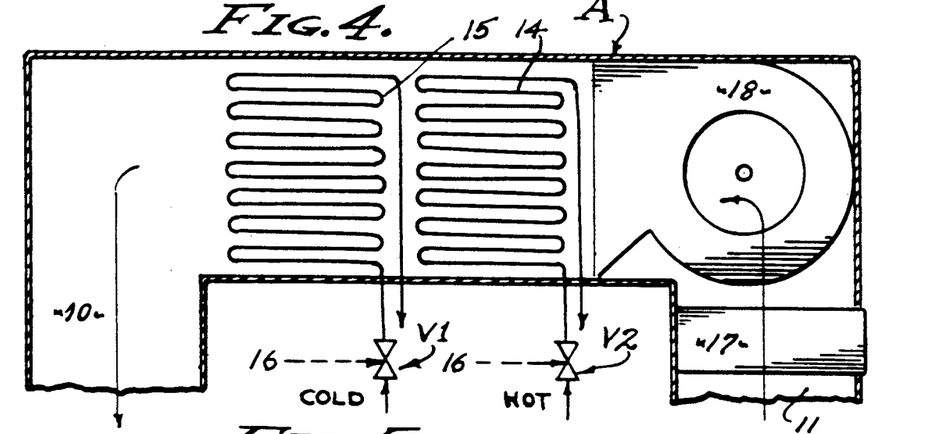
FIG. 4 is a sectional view of the air conditioner unit as taken by line 4—4 on FIG. 3.

Referring now to FIG. 3 of the drawings, there is a central controller means 16 that responds to the highest temperature demand of any one of the thermostats T in the heating mode to activate the heating coil 14 of air conditioning unit A, and alternately responds to the lowest temperature demand of any one of the thermostats T in the cooling mode to activate the cooling coil 15 of air conditioning unit A. Accordingly, the controller means 16 includes a mode sensing means 65 that responds to either the heating or the cooling mode, and a demand signal modulating means 65 that responds to the IAQ sensor S2 for opening the secondary damper means 60 in excess of its normal pressure balance condition in duct 56 established by the primary damper means 57. As a result, the damper means 57 modulates toward closed while damper means 60 modulates toward open in order to meet the IAQ sensor demand, and maintaining a constant back pressure in the supply air duct 10.

There is a chilled water valve V1 from a chilled water source (not shown), and there is a hot water valve V2 from a hot water source (not shown). The valves V1 and V2 are motorized modulating valves responsive to the control means 16. Operation is as follows:

When the supply fan or blower 18 is OFF, the chilled water and hot water sources are locked out by the controller means 16. And, when the system is ON and the blower 18 is OFF, with no call from the air distribution system controls and/or thermostats T, the chilled water valve V1 and the hot water valve V2 also remain closed; while the chilled water and hot water sources are ready ON.

When the supply air blower 18 is ON, with no call for cooling from the air distribution system zone theremostats T but with a call for contamination removal from sensor S2 to the controller means 16, the chilled water valve V1 is modulated open and the hot water valve V2 remains closed; while the secondary SA bypass damper 60 is opened commensurate with the demand of sensor S2, lowering the supply air (SA) temperature leaving coil 15 and dehumidifying the same. The zone damper modules D will then modulate to close and thereby increase supply duct (SA) pressure so as to induce run-around circulation of supply air through the ducts 55 and 56 of the bypass filtration module M.

When the supply air blower 18 is ON, with a demand for cooling from the air distribution system zone thermostats T, but with no call for contaminant removal from the IAQ sensor S2, the chilled water valve V1 is modulated open by the controller means 16 to supply chilled water to the cooling coil 15, lowering supply air (SA) temperature, valve V2 being closed and the secondary bypass damper 60 closed.

When the supply air blower 18 is ON with a demand for cooling from the air distribution system thermostats T and a demand for contaminant removal from the sensor S2 through controller means 16, the hot water valve V2 remains closed and the chilled water valve V1 is modulated open toward full cooling and dehumidification; and the secondary bypass damper 60 is modulated toward open accordingly.

When the supply air blower 18 is ON with a demand for heat from the air distribution system thermostats T and through the controller means 16, the chilled water valve V1 remains closed and the hot water valve V2 is modulated open to provide hot water to the heating coil 14. The secondary bypass damper 60 remains closed, increasing supply air temperature.

When in the heating mode and there is a subsequent demand for further contaminant removal, the hot water valve V2 is modulated further so as to increase supply air temperature; or alternately in the cooling mode the chilled water valve V1 is modulated further so as to decrease supply air temperature. The secondary bypass damper 60 is opened and the primary bypass damper closed as required.

Figure 2:
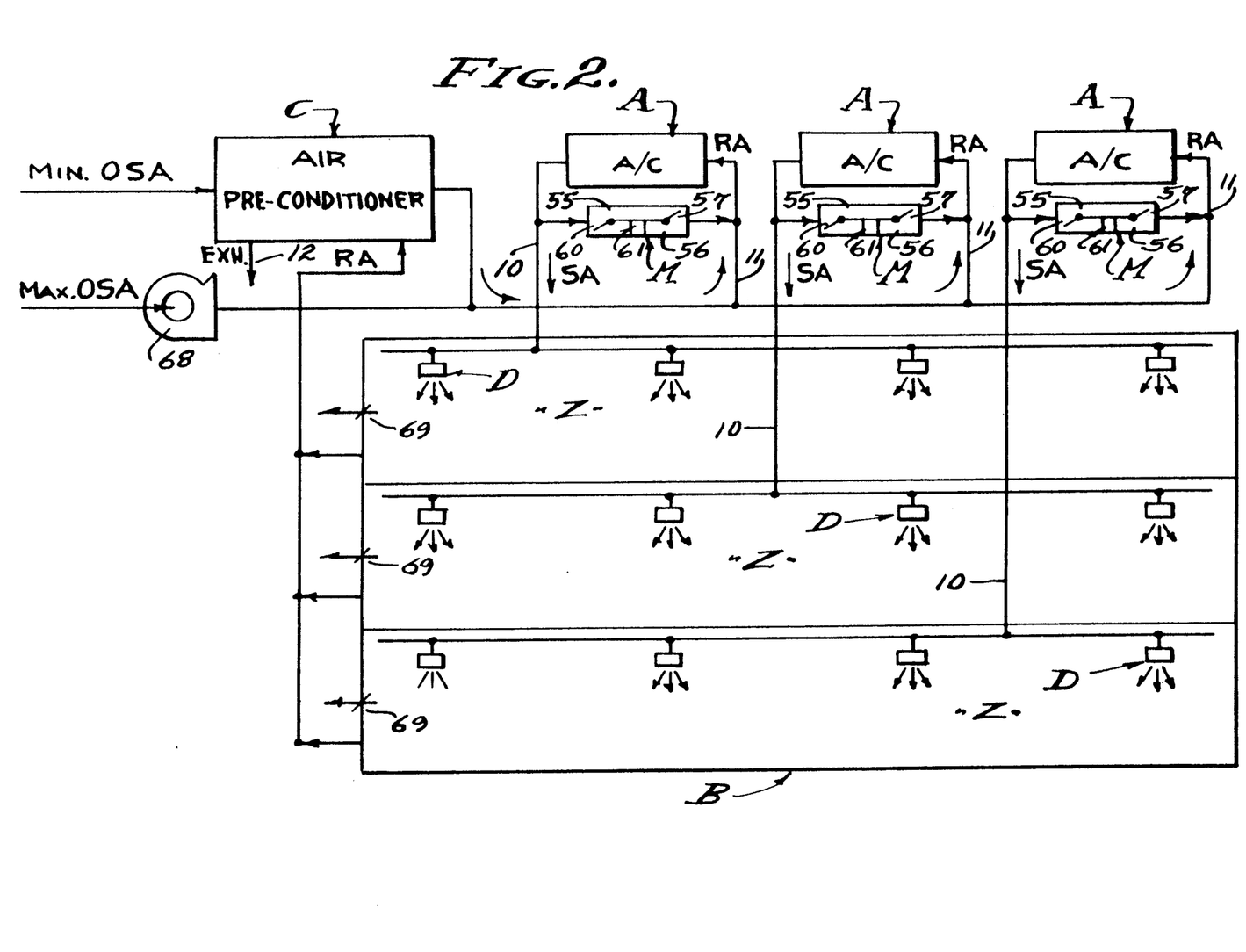
FIG. 2 is a view similar to FIG. 1, wherein a humidity air-preconditioner serves at least one and preferably a plurality of central air conditioner units.

When contaminant removal demand is not met by the full opening of the secondary bypass damper 60, outside air maximizing means 67 in the controller means 16 activates an OSA blower 68 commensurately (see FIG. 2) to add fresh outside air into the system through the intake ducting 11 into the air conditioning units A, there being relief air dampers 69 to eliminate back pressure from each comfort zone Z. Thus, the outside air OSA is augmented on demand by dilution to maintain pollutant removal as required. Alternately, the preconditioner module C performs the aforementioned adding of outside air to the system (see FIG. 1) by supplying increased outside supply air (SA) to the comfort zone Z. In practice, the fans F1 and F2 of the preconditioner module C are variable speed fans that are modulated in response to IAQ sensor S2 demand through the outside air maximizing means 67 of the controller means 16. Again, the relief air dampers 69 eliminate comfort zone back pressure.

In accordance with this invention, the bypass filtration module M is responsive to open in proportion to back pressure in the supply air duct, as a result of closing down the zone damper modules D as controlled by the zone thermostats T. A feature is the parallel bypass damper 57 and separate parallel secondary filter 61 that opens in response to the increase in back pressure, so as to improve air quality as required when there is a zone change in temperature that causes an air flow increase. This air flow increase and opening of the secondary filter bypass 56 implements the secondary filter 61, a gas absorber, in response to the thermostats T, and thereby increases bypass air filtering and dehumidification. A feature is the substantially greater flow area through the secondary filter 61 compared with the flow area through the pressure responsive duct 55. Air quality sensors S2 can be located in the comfort zones Z, or in either the return air (RA) or supply air (SA) duct as shown.

The IAQ sensor S2 is a means that is, for example, designed to sense a wide variety of volatile chemicals by sensing the reduction potential of the air. This allows the sensor to respond to the aggregate effect of many pollutants based upon their ability to be absorbed. Carbon dioxide is a known indication of building occupancy contamination, though it is not in itself dangerous, and it is known that building inhabitants emit gasses other than $CO_2$ (i.e. methane) which have high reduction potentials. The IAQ sensors are sensitive to a broad range of chemicals which pollute the air, especially Volatile Organic Compounds (VOC), as follows:

| | |
|---|---|
| Hydrogen Sulfide | $H_2S$ |
| Vinyl Chloride | $CHC_3CL$ |
| Methyl Ethyl Ketone | $C_4H_8O$ |
| Hydrogen | $H_2$ |
| Methanol | $CH_4O$ |
| Gasoline | $C_xH_x$ (x is variable) |
| Formaldehyde | $CH_2O$ |
| Trichloroethylene | $C_2HCL_3$ |
| Acetone | $C_3H_6O$ |
| Ethanol | $C_2H_6O$ |
| Freon -22 | $CHClF_2$ |
| Ammonia | $NH_3$ | and others such as Freon 12, Propane, Methane, Methyl Choride, Carbon Monoxide, Nitrogen Dioxide and Chlorine.

The IAQ sensor S2 is a means that includes a sensing element and a signal condition circuit. The sensor S2 can be a small ceramic coated with stannic oxide (silver-lead oxide) and a heater placed to heat the element. An air sample is absorbed into the stannic oxide coating so that electron transfer takes place between any reducible gasses and oxygen atoms offered by the heated stannic oxide. This electron transfer increases the conductivity of the element, corresponding to the reduction potential of the airborne pollutants. In practice, signal conditioning converts the signal to a zero to ten volt range. The sensor S2 is callibrated using an inert gas mixed with methane at 1000 PPM, producing a 3.5 volt signal which corresponds to acceptable air quality, for example.

This invention deals with indoor air pollution generated by building materials, appliances, furnishings, and by human occupancy, all of which generates air pollution wherein the number of occupants in a building is most often unknown, said occupancy OSA volume requirement being estimated in most instances using the maximum occupancy for the building involved. Since most building usage is less than maximum occupancy, the use of maximum occupancy to determine the minimum OSA volume is very wasteful. However, the monetary penalty for good IAQ can be reduced by using demand ventilation with automatic adjustment of outside air volume to dilute the indoor air to an acceptable quality.

The secondary air filter 61 is provided to remove the aforementioned airborne contamination from the conditioned air, by withdrawing it from the supply air (SA) duct 10 by means of the run-around system. The primary bypass duct 55 and damper 59 responds to supply air back pressure, for run-around of air volume greater than the demand therefor. And, the secondary bypass 56 and damper 60 responds to quality of conditioned air, for parallel run-around of said air volume to be refined after particulate filtration by the primary filter 17. That is, the secondary air filter 61 removes the gaseous pollutants that are carried by the supply air, and as shown herein as comprised of a gas filter pack disposed between a pre-filter 71 and an after filter 72. The pre-filter 71 is constructed to remove particulate matter finer than that removed by the primary filter 17 and the after filter 72 is constructed to remove particulate matter that is finer yet. The degree of particulate filtration can be varied as may be required. The intermediate gas filter 70 is, for example, a carbon pellet pack capable of passing the contaminated air while absorbing the airborne gasses therefrom.

In accordance with this invention, the secondary filter 61 is provided for pollutant gas removal, and fine particulate matter as well. In practice, an activated carbon pack of pellets is preferred, as it is conducive to relatively free flow of run-around air and presents an extremely large area per bulk weight, for example 1 lb./6,000,000 square feet. Filtration is by means of the condensation of pollutant gasses upon said surface area of carbon pores that absorb and retain the film of liquid that is formed, together with fine particulate substances dissolved therein. Among the substances carried by polluted gasses such as carbon dioxide ($CO_2$) are tobacco smoke, smog, food odors, animal odors as well as human odors, and structural and furnishing odors. Such a filter pack will saturate to about 50% of its weight with gasses and particulate matter, after which replacement and/or reactivation is required for efficient performance.

In accordance with this invention, the bypass filter module M is comprised of the parallel bypass ducts 55 and 56, the secondary filter 61, and the motorized damper means 56 and 60 (see FIG. 1). A branch duct 75 withdraws supply air (SA) from duct 10, supplying the same to the parallel ducts 55 and 56 of the module M, while damper means 57 controls the run-around through duct 55 of withdrawn supply air, and variable damper means 60 controls run-around air through duct 56. A feature of module M, as it is shown, is the damper means 60 positioned at the intake of module M to simultaneously modulate the duct 56 while proportionately controlling air intake into ducts 55 and 56. Also, the damper means 57 is positioned at the discharge of the module mean M to simultaneously open and close the duct 55 while proportionately controlling air discharge from ducts 55 and 56.

SUMMARY:

This is a Heating, Ventilating and Air Conditioning (HVAC) system with Variable Air Volume (VAV) flow control response to both net space demands for heating and/or cooling and for air filtering, by introducing more or less air into a multiplicity of occupied air spaces. Indoor Air Quality (IAQ) involves the use of an airborne pollution sensor, such as a $CO_2$ or VOC sensor, in a ventilation demand driven system with filters capable of maintaining acceptable airborne contamination levels without sacrificing comfort. Use of secondary high efficiency gas filter/air cleaners in a variable air volume bypass loop provides a means for offsetting reduced air supply rates without sacrificing indoor air quality. This system utilizes minimum outside air (15 cfm/person) with demand control (30% air) and provides a thermostat in every comfort zone, which allows each system air damper to effectively monitor and control the temperature of each zone Z. Should any zone require additional ventilation control due to a rise in airborne contamination (volitile organic compound levels), the system will adjust the supply air temperature and thereby automatically allow more air bypass to the high efficiency bypass filtration module M to increase system source removal capability. As a result, clean air is supplied to the occupied zone whenever the supply airflow rate is reduced during the VAV mode of the system. In practice, the bypass flow does not exceed ⅓ of the air conditioning unit A supply air (SA) flow. Indoor air quality may deteriorate if the bypass airflow exceeds ⅓ of the system flow, even with a 100% efficient aircleaner in the bypass run-around loop.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. An air quality-temperature controlled central conditioning system having a return air inlet from and a supply air outlet to at least one comfort zone, and including;

an air conditioning means receiving comfort zone air at the return air inlet and supplying tempered air pressured by a blower means through the supply air outlet, a damper module at the supply air outlet and modulated between closed and open positions to discharge air into the comfort zone in response to a temperature demand for said zone, parallel bypass ducts extending from the supply air outlet to the return air inlet, one a primary duct with a primary bypass damper means modulated between closed and open positions in response to supply air outlet pressure, and one a secondary duct with a secondary bypass damper means modulated between closed and open positions in response to an indoor air quality sensor means exposed to air of the comfort zone, and air filtration means in the secondary duct to remove pollutant matter from supply air recirculated to the return air inlet and through the air conditioning means.

2. The air quality-temperature controlled system as set forth in claim 1, wherein the air conditioning means heats or cools the return air in response to thermostat means in the comfort zone.

3. The air quality-temperature controlled system as set forth in claim 1, wherein modulation of the said damper module toward a closed position increases pressure at the supply air outlet, there being a pressure sensor means responsive to air pressure at said outlet for modulating the primary bypass damper means toward an open position for run-around of supply air to the supply air inlet commensurate with increased pressure at said supply air outlet.

4. The air quality-temperature controlled system as set forth in claim 1, there being am indoor air quality sensor means responsive to the degree of comfort zone air quality deterioration and for modulating the secondary damper means toward an open position for run-around of supply air to the supply air inlet commensurate to said degree of deterioration.

5. The air quality-temperature controlled system as set forth in claim 1, wherein modulation of the said damper module toward a closed position increases pressure at the supply air outlet, there being a pressure sensor means responsive to air pressure at said outlet for independently modulating the primary bypass damper means toward an open position for run-around of supply air to the supply air inlet commensurate with increased pressure at said supply air outlet, and there being an indoor air quality sensor means responsive to the degree of comfort zone air quality deterioration and for independently modulating the secondary damper means toward and open position for run-around of supply air to the supply air inlet commensurate to said degree of deterioration.

6. The air quality-temperature controlled system as set forth in claim 3, wherein there is a supply air duct from said supply air outlet, and wherein there is a multiplicity of comfort zones and each with at least one of said damper modules responsive to theremostat means.

7. The air quality-temperature controlled system as set forth in claim 6, wherein controller means is responsive to the multiplicity of thermostat means for activating the air conditioning means on demand for cooling and heating.

8. The air quality-temperature controlled system as set forth in claim 6, wherein the indoor air quality sensor is disposed to respond to return air from said multiplicity of comfort zones.

9. The air quality-temperature controlled system as set forth in claim 1, wherein the filtration means includes an activated carbon filter pack for the removal of pollutant gasses and fine particulate matter absorbed therein from the supply air recirculated through the secondary duct.

10. The air quality-temperature controlled system as set forth in claim 1, wherein controller means responsive to a demand of the indoor air quality sensor modulates the secondary damper means toward open in excess of a normal pressure balance condition in the primary bypass duct, whereby the primary damper means modulates toward close so as to maintain constant supply air back pressure.

11. The air quality-temperature controlled system as set forth in claim 1, wherein controller means having a mode sensing means responds to either a heating mode or a cooling mode demand of a zone thermostat to establish a normal pressure balance condition and having a demand signal modulating means responsive to the indoor air quality sensor means to modulate the secondary damper means toward open in excess of said normal pressure balance in the primary bypass duct, whereby the primary damper means modulates toward close so as to maintain constant supply air back pressure.

12. An air quality-temperature controlled central conditioning system having a return air inlet from and a supply air outlet to at least one comfort zone, and including in combination:
an air conditioning means receiving comfort zone air at the return air inlet and supplying tempered air pressured by blower means through the supply air outlet,
a damper module at the supply air outlet and modulated between closed and open positions to discharge air into the comfort zone in response to a temperature demand for said zone,
and an air bypass filtration module comprised of a unit having parallel bypass ducts extending from the supply air outlet to the return air inlet, one a primary duct with a primary bypass damper means modulated between closed and open positions in response to supply air outlet pressure, and one a secondary duct with a secondary bypass damper means modulated between closed and open positions in response to an indoor air quality sensor means exposed to air of the comfort zone, and air filtration means in the secondary duct to remove pollutant from the supply air recirculated to the return air inlet and through the air conditioning means.

13. The air quality-temperture controlled system as set forth in claim 12, wherein the air conditioning means heats or cools the return air in response to thermostat means in the comfort zone.

14. The air quality-temperature controlled system as set forth in claim 12, wherein modulation of the said damper module toward a closed position increases pressure at the supply air outlet, there being a pressure sensor means responsive to air pressure at said outlet for modulating the primary bypass damper means toward an open position for run-around of supply air to the supply air inlet commensurate with increased pressure at said supply air outlet.

15. The air quality-temperature controlled system as set forth in claim 12, there being an indoor air quality sensor means responsive to the degree of comfort zone air quality deterioration and for modulating the secondary damper means toward an open position for run-around of supply air to the supply air inlet commensurate to said degree of deterioraton.

16. The air quality-temperature controlled system as set forth in claim 12, wherein modulation of the said damper module toward a closed position increases pressure at the supply air outlet, there being a pressure sensor means responsive to air pressure at said outlet for independently modulating the primary bypass damper means toward an open position for run-around of supply air to the supply air inlet commensurate with increased pressure at said supply air outlet, and there being an indoor air quality sensor means responsive to the degree of comfort zone air quality deterioration and for independently modulating the secondary damper means toward and open position for run-around of supply air to the supply air inlet commensurate to said degree of deterioration.

17. The air quality-temperature controlled system as set forth in claim 14, wherein there is a supply air duct from said supply air outlet, and wherein there is a multiplicity of comfort zones and each with at least one of said damper modules responsive to thermostat means.

18. The air quality-temperature controlled system as set forth in claim 17, wherein controller means is responsive to the multiplicity of thermostat means for activating the air conditioning means on demand for cooling and heating.

19. The air quality-temperature controlled system as set forth in claim 17, wherein the indoor quality sensor is disposed to respond to return air from said multiplicity of comfort zones.

20. The air quality-temperature controlled system as set forth in claim 12, wherein the filtration means includes an activated carbon filter pack for the removal of pollutant gasses and fine particulate matter absorbed therein from the supply air recirculated through the secondary duct.

21. The air quality-temperature controlled system as set forth in claim 12, wherein controller means responsive to a demand of the indoor air quality sensor modulates the secondary damper means toward open in excess of a normal pressure balance condition in the primary bypass duct, whereby the primary damper means modulates toward close so as to maintain constant supply air back pressure.

22. The air quality-temperature controlled system as set forth in claim 12, wherein controller means having a mode sensing means responds to either a heating mode or a cooling mode demand of a zone thermostat to establish a normal pressure balance condition and having a demand signal modulating means responsive to the indoor air quality sensor means to modulate the secondary damper means toward open in excess of said normal pressure balance in the primary bypass duct, whereby the primary damper means modulates toward close so as to maintain constant supply air back pressure.

23. A humidity-air quality-temperature controlled central conditioning system having a return air inlet from and a supply air outlet to at least one comfort zone, and including in combination;
- an outside air preconditioner comprising ventilation air ducting means for adding to the supply air entering the comfort zone, there being desiccant disposed therein for co-absorption of gasses and moisture, and exhaust air ducting means and desiccant disposed therein for regeneration by heating means and blower means transporting said ventilation air and exhaust air through said respective ducting means,
- an air conditioning means receiving comfort zone air through the return air inlet and supplying tempered air pressured by blower means through the supply air outlet,
- a damper module in the supply air inlet and modulated between closed and opened positions into the comfort zone in response to a temperature demand controlled means for said at least one comfort zone,
- parallel bypass ducts from the supply air outlet to the return air inlet, one a primary duct with a primary bypass damper means modulated between closed and opened positions in response to demand by a pressure sensor in the supply air outlet, and one a secondary inlet with a secondary bypass damper means modulated between closed and opened positions in response to an indoor air quality sensor means exposed to air of said at least one comfort zone,
- and air filtration means in the secondary duct to remove pollutant from supply air outlet air recirculated to the return air inlet and through the air conditioning means.

24. The humidity-air quality-temperature controlled system as set forth in claim 23, wherein the outside air preconditioner adds either humidified or dehumidified air directly into the at least one comfort zone, there being a relief damper means opening from the at least one comfort zone for eliminating back pressure therein.

25. The humidity-air quality-temperature controlled system as set forth in claim 23, wherein the outside air preconditioner adds either humidified or dehumidified air directly into the return air inlet of the air conditioning means, there being relief damper means opening from the at least one comfort zone for eliminating back pressure therein.

26. The humidity-air quality-temperature controlled system as set forth in claim 25, wherein outside air to the return air inlet of the air conditioner means is maximized by a blower means in parallel with the preconditioner and discharging into said return air inlet of the air conditioning means.

27. The humidity-air quality-temperature controlled system as set forth in claim 24, wherein the ventilation air ducting means and exhaust air ducting means of the outside air preconditioning means include variable volume fan means modulated to increase minimum outside air into the comfort zone.

28. The humidity-air quality-temperature controlled system as set forth in claim 25, wherein the ventilation air ducting means and exhaust air ducting means of the outside air preconditioning means include variable volume fan means modulated to increase minimum outside air into the return air inlet of the air conditioning means.

* * * * *

UNITED STATES PATENT AND TRADEMARK OFFICE
CERTIFICATE OF CORRECTION

PATENT NO. : 5,279,609

DATED : Jan. 18, 1994

INVENTOR(S) : MILTON MECKLER

It is certified that error appears in the above-identified patent and that said Letters Patent is hereby corrected as shown below:

Col. 3 line 4, delete "as taken by line 6-6 on Fig. 3";

Col 3 line 54, after "passes" insert -- return air --;

Col. 4 line 6, delete "19"; Col. 4 line 16, change "Porpor-" to -- Propor- --; Col. 4 line 48, change "absorbtion" to -- adsorption --; Col. 4 line 49, change "place" to -- placed --; Col. 5 line 25, change "absorbtion " to -- adsorption --; Col. 5. line 25 change "dehumification" to -- dehumidification --; Col 5 line 29, change "37" to -- 38 --; Col. 5 line 31, change "38" to -- 37 --; Col. 5 line 34, change "F1" to -- F2 --; Col. 6 line 63, change "theremo-" to -- thermo- --; Col. 7 line 37, before "closed" insert -- 57 --.

UNITED STATES PATENT AND TRADEMARK OFFICE
CERTIFICATE OF CORRECTION

PATENT NO. : 5,279,609
DATED : Jan. 18, 1994
INVENTOR(S) : Milton Meckler

It is certified that error appears in the above-indentified patent and that said Letters Patent is hereby corrected as shown below:

Col. 9 line 1, change "58" to -- 57 --;  Col. 9 line 9, after "pack" insert -- 70 --;  Col. 10 line 65, change "am" to -- an --;  Col. 11 line 22, change "theremostat" to -- thermostat --.

Signed and Sealed this

Sixth Day of September, 1994

Attest:

BRUCE LEHMAN

*Attesting Officer*     *Commissioner of Patents and Trademarks*